US012772049B2

(12) United States Patent
Smeets et al.

(10) Patent No.: US 12,772,049 B2
(45) Date of Patent: Oct. 20, 2026

(54) MULTI-TENANT ANONYMIZATION WITH FORENSICS CAPABILITIES (MAF)

(71) Applicant: Telefonaktiebolaget LM Ericsson (publ), Stockholm (SE)

(72) Inventors: Bernard Smeets, Dalby (SE); Harri Hakala, Turku (FI); Tommy Arngren, Södra Sunderbyn (SE); Yosr Jarraya, Montreal (CA); Makan Pourzandi, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 577 days.

(21) Appl. No.: 18/001,972

(22) PCT Filed: Jun. 25, 2020

(86) PCT No.: PCT/IB2020/056032

§ 371 (c)(1),
(2) Date: Dec. 15, 2022

(87) PCT Pub. No.: WO2021/260418

PCT Pub. Date: Dec. 30, 2021

(65) Prior Publication Data

US 2023/0239687 A1 Jul. 27, 2023

(51) Int. Cl.
*H04M 1/66* (2006.01)
*H04W 12/02* (2009.01)
(Continued)

(52) U.S. Cl.
CPC ......... *H04W 12/041* (2021.01); *H04W 12/02* (2013.01); *H04W 12/0431* (2021.01)

(58) Field of Classification Search
CPC ..... H04W 12/02; H04W 12/03; H04W 12/12; H04W 12/041; H04W 12/0431; H04L 63/062; H04L 9/08; G06F 21/6254
See application file for complete search history.

(56) References Cited

U.S. PATENT DOCUMENTS 11,003,783 B1 * 5/2021 Ursachi ................. G06F 21/602
2006/0034460 A1 2/2006 Huberman et al.
(Continued)

OTHER PUBLICATIONS

International Search Report and Written Opinion dated Feb. 23, 2021 issued in PCT Application No. PCT/IB2020/056032, consisting of 15 pages.
(Continued)

*Primary Examiner* — Shantell L Heiber
(74) *Attorney, Agent, or Firm* — Weisberg I.P. Law, P.A.

(57) ABSTRACT

According to some embodiments, a security management entity is provided. The security management entity includes processing circuitry configured to: generate a key having a plurality of key parts, anonymize at least a first data instance at least in part by using the key with threshold cryptography, transmit a respective key part to each one of the plurality of trusted entities, store at least one key part where the stored at least one key part is different from the transmitted respective key parts, receive a message from a first trusted entity of the plurality of trusted entities for investigating the anonymized first data instance where the message includes one of the transmitted respective key parts, and deanonymize the first data instance using the stored at least one key part and the one of the transmitted respective key parts associated with the first trusted entity.

20 Claims, 5 Drawing Sheets

(51) Int. Cl.

| | |
|---|---|
| ***H04W 12/041*** | (2021.01) |
| ***H04W 12/0431*** | (2021.01) |

(56) References Cited

U.S. PATENT DOCUMENTS

| | | | | |
|---|---|---|---|---|
| 2018/0019871 | A1* | 1/2018 | Gage | G06F 21/6209 |
| 2018/0083952 | A1* | 3/2018 | Gummididala | H04L 63/083 |
| 2018/0205707 | A1* | 7/2018 | Bellala | H04L 9/085 |
| 2020/0169875 | A1* | 5/2020 | Sundar | H04L 9/14 |
| 2021/0264054 | A1* | 8/2021 | Anson | H04L 9/50 |

OTHER PUBLICATIONS

Michele Boreale et al., Relative Privacy Threats and Learning From Anonymized Data; IEEE Transactions on Information Forensics and Security, vol. 15, 2020, consisting of 15 pages.

Bjorn Groneberg, Threshold Cryptography, Cloud Security Mechanisms, Jul. 9, 2013, consisting of 43 pages.

Mathias Lecuyer et al., Certified Robustness to Adversarial Examples with Differential Privacy; 2019 IEEE Symposium on Security and Privacy, consisting of 18 pages.

* cited by examiner

MULTI-TENANT ANONYMIZATION WITH FORENSICS CAPABILITIES (MAF)

CROSS-REFERENCE TO RELATED APPLICATION

This application is a Submission Under 35 U.S.C. § 371 for U.S. National Stage Patent Application of International Application Number: PCT/IB2020/056032, filed Jun. 25, 2020 entitled "MULTI-TENANT ANONYMIZATION WITH FORENSICS CAPABILITIES (MAF)," the entirety of which is incorporated herein by reference.

TECHNICAL FIELD

Security systems and in particular, multi-tenant systems with forensics capabilities.

BACKGROUND

Security Management systems provide analytics and a monitoring platform as a service to enterprises through a Service Provider. A connectivity platform, e.g., a Device Communications Platform, is used to host/run virtual resources/Virtual Machines (VMs) associated with internet of things (IoT) devices. The service provider and the enterprises can have their own service operation center (SoC) teams as illustrated in FIG. 1 to investigate the security of devices.

A security management system serves several customers delivering the security service to service providers and enterprises. The service provider provides IoT related security services to their customers, that is, to the enterprises. Enterprises use the IoT security service they have purchased from the service provider. There can be customers having their own enclaves, also referred to as Trusted Execution Environments (TEEs), and the security management system can have a common enclave. Customers can have their own SoCs on top of security management system.

As used herein, a TEE is a secure area in the main processor and/or memory that offers guarantees with respect to confidentiality and integrity for data and code loaded within. TEE solutions may enable isolated execution, secure storage, remote attestation, secure provisioning and trusted path. In the case of unikernels, TEEs may offer additional protection for security-sensitive information against privileged users, especially in the case of virtualized environments. There is a number of TEEs currently available, i.e.: ARM TrustZone (TZ) and Intel Software Guards eXtensions (SGX)— Intel SGX is a mechanism that enables the creation of TEEs. The user application uses SGX to create a protected area referred to as an enclave. An enclave is an isolated region of code and data within the address space for an application. Only code that runs within the enclave can access data within the same enclave.

It may be assumed that there is applicable privacy legislation that concerns security services, e.g., European Union (EU) General Data Protection Regulation (GDPR). From a GDPR point of view, the end-user is the data subject who receives the service from the enterprise. The enterprise who has purchased security services from the service provider is the Data Controller having an agreement with their end-users. The enterprise presents the privacy notice to their end-users and acquires end-user consent for the data usage and processing.

The service provider who has procured security services from the vendor of the Security Management system is the Data Processor. The service provider acts as Data Processor with the consent given by the Data Controller to provide IoT security services to the Data Controller and their end-customers.

The vendor of the Security Management system acts as a Data Sub-Processor with the consent given by the Data Processor in the agreement and has no interaction with the end-user. The purpose of the data processing is to deliver IoT security services to the Data Processor and their customers.

In some troubleshooting cases, the enterprise's SoC team suspects one or several devices/users to have malicious or bogus behavior. The SoC team may then need to know some subscriber data related to specific end user/IoT, e.g., related to the specific IoT such as an IoT vehicle.

However, the existing approaches are built around the anonymization of data by the security manager and then storing the anonymized data. Most of the existing approaches focus on minimizing the risk for any individual in the dataset to be linked to a specific sensitive value in the dataset. For example, anonymization approaches based on differential privacy techniques aim at protecting individuals' privacy by adding enough noise to the query result. These existing approaches are coarse grained and do not support any authorization mechanism by the customer. For example, the existing approaches do not properly support privacy data processing for the security services in multi-tenant environments as it is a problem to backtrack from anonymized data to some specific device/user in order to find out about the specific device/user and its behavior. Once the data is anonymized by the security solution, there is generally no way to go back and find the traces necessary of forensics. This is then a hindrance to forensics in the customer networks in case of malicious or bogus behavior. Therefore, backtracking from anonymized data in a multi-tenant setting is not supported in existing systems.

SUMMARY

Some embodiments advantageously provide a method and system for multi-tenant systems with forensics capabilities. One or more embodiments described herein provide an approach that can be used as a solution to make GDPR compliant regarding pseudonymization and anonymization of personal data any managed proposed security solutions by the operators to the enterprise.

One or more embodiments provide a method that, when an attack occurs on the system (i.e., a security event is detected), it is possible to backtrack from anonymized data, for example, to some specific device associated with the data in order to find out specific information about the device/user. This may be necessary for forensics and may provide evidence of malicious behavior. However, it would be advantageously to have the backtracking be possible only when authorized by the customer (either data subject or data controller), such as to provide customers with strict access control to their deanonymized data.

Therefore, as described herein with respect to one or more embodiments, when an attack occurs (i.e., a security event is detected), it may be possible to backtrack from anonymized data to some specific device in order to find out about specific device/user. However, this backtracking may be authorized by the customer, e.g., through the consent provided by the customer, thereby keeping customer control of access to the deanonymized data.

One or more aspects of one or more embodiments may include one or more of:

- A mechanism to implement appropriate security of processing control to make possible anonymization and encryption of personal data using a key sharing mechanism using threshold crypto between different actors/entities: one actor receiving data from multiple clients, anonymizing/storing (resp. retrieving/deanonymizing) data authorized by the security authorities for those customer. For example, actors such as GDPR data controller and data processor roles.
- A mechanism to outsource the anonymization and storage of the data from the data controller (e.g., CSP) to the third party data processor (e.g., security management entity).
- A mechanism allowing to backtrack/retrieve the anonymized data with the authorization from a trusted party/entity.
- A mechanism that can be applied to partial decryption of anonymized data such that the data controller can then analyze the deanonymized data.
- A mechanism that support the use of data anonymization and back tracking of the authorized data in a multi-tenant setup.

According to one aspect of the disclosure, a security management entity for communication with a plurality of trusted entities is provided. The security management entity includes processing circuitry configured to: generate a key having a plurality of key parts, anonymize at least a first data instance (Ai) at least in part by using the key with threshold cryptography, transmit a respective key part of the plurality of key parts to each one of the plurality of trusted entities, store at least one key part of the plurality of key parts where the stored at least one key part is different from the transmitted respective key parts, receive a message from a first trusted entity of the plurality of trusted entities for investigating the anonymized first data instance where the message includes one of the transmitted respective key parts associated with the first trusted entity, and deanonymize the first data instance using the stored at least one key part and the one of the transmitted respective key parts associated with the first trusted entity.

According to one or more embodiments of this aspect, the anonymizing includes concatenating each of a plurality of data instances with a respective token, and anonymizing each concatenation of the data instance with the respective token using the key with threshold cryptography where the plurality of data instances includes the first data instance. According to one or more embodiments of this aspect, the anonymizing includes adding a token to the first data instance and encrypting both the first data instance and the token, the token being specific to the first data instance. According to one or more embodiments of this aspect, the deanonymization of the first data instance includes decrypting a subset of a plurality of data instances having a same attribute type as the first data instance, the subset including the first data instance, filtering the subset based on a value associated with the attribute type, retrieving a value associated with the token, and de-concatenating the value associated with the token from the decrypted first data instance.

According to one or more embodiments of this aspect, the stored at least one key is a plurality of stored key parts different from the transmitted respective key parts. According to one or more embodiments of this aspect, a quantity of the stored plurality of keys equals a quantity of the plurality of trusted entities. According to one or more embodiments of this aspect, the threshold cryptography is configured for a (k, n) schema where k key parts out of n key parts are used to retrieve the key where n is equal to a sum of a quantity of trusted entities and a quantity of the stored at least one key part.

According to one or more embodiments of this aspect, the processing circuitry is further configured to transmit the deanonymize first data instance to the first trusted entity. According to one or more embodiments of this aspect, the message from the first trusted entity of the plurality of trusted entities for investigating the first data instance is associated with an occurrence of at least one predefined security event.

According to another aspect of the disclosure, a method for a security management entity for communication with a plurality of trusted entities is provided. A key having a plurality of key parts is generated. At least a first data instance is anonymized at least in part by using the key with threshold cryptography. A respective key part of the plurality of key parts is transmitted to each one of the plurality of trusted entities. At least one key part of the plurality of key parts is stored where the stored at least one key part being different from the transmitted respective key parts. A message from a first trusted entity of the plurality of trusted entities for investigating the anonymized first data instance is received where the message includes one of the transmitted respective key parts associated with the first trusted entity. The first data instance is used to deanonymize the stored at least one key part and the one of the transmitted respective key parts associated with the first trusted entity.

According to one or more embodiments of this aspect, the anonymizing includes: concatenating each of a plurality of data instances with a respective token; and anonymizing each concatenation of the data instance with the respective token using the key with threshold cryptography where the plurality of data instances includes the first data instance. According to one or more embodiments of this aspect, the anonymizing includes adding a token to the first data instance and encrypting both the first data instance and the token where the token is specific to the first data instance. According to one or more embodiments of this aspect, the deanonymization of the first data instance includes: decrypting a subset of a plurality of data instances having a same attribute type as the first data instance where the subset includes the first data instance, filtering the subset based on a value associated with the attribute type, retrieving a value associated with the token, and de-concatenating the value associated with the token from the decrypted first data instance.

According to one or more embodiments of this aspect, the stored at least one key is a plurality of stored key parts different from the transmitted respective key parts. According to one or more embodiments of this aspect, a quantity of the stored plurality of keys equals a quantity of the plurality of trusted entities. According to one or more embodiments of this aspect, the threshold cryptography is configured for a (k, n) schema where k key parts out of n key parts are used to retrieve the key where n is equal to a sum of a quantity of trusted entities and a quantity of the stored at least one key part.

According to one or more embodiments of this aspect, the deanonymize first data instance is transmitted to the first trusted entity. According to one or more embodiments of this aspect, the message from the first trusted entity of the plurality of trusted entities for investigating the first data instance is associated with an occurrence of at least one predefined security event.

According to another aspect of the disclosure, a computer readable storage medium configured to store instructions is provided. When the instructions are executed by a processor, the processor is caused to: generate a key having a plurality of key parts, anonymize at least a first data instance (Ai) at least in part by using the key with threshold cryptography, transmit a respective key part of the plurality of key parts to each one of a plurality of trusted entities, store at least one key part of the plurality of key parts where the stored at least one key part is different from the transmitted respective key parts, receive a message from a first trusted entity of the plurality of trusted entities for investigating the anonymized first data instance where the message includes one of the transmitted respective key parts associated with the first trusted entity, and deanonymize the first data instance using the stored at least one key part and the one of the transmitted respective key parts associated with the first trusted entity.

According to one or more embodiments of this aspect, the anonymizing includes adding a token to the first data instance and encrypting both the first data instance and the token, the token being specific to the first data instance. The deanonymization of the first data instance includes: decrypting a subset of a plurality of data instances having a same attribute type as the first data instance, the subset including the first data instance, filtering the subset based on a value associated with the attribute type, retrieving a value associated with the token, and de-concatenating the value associated with the token from the decrypted first data instance.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
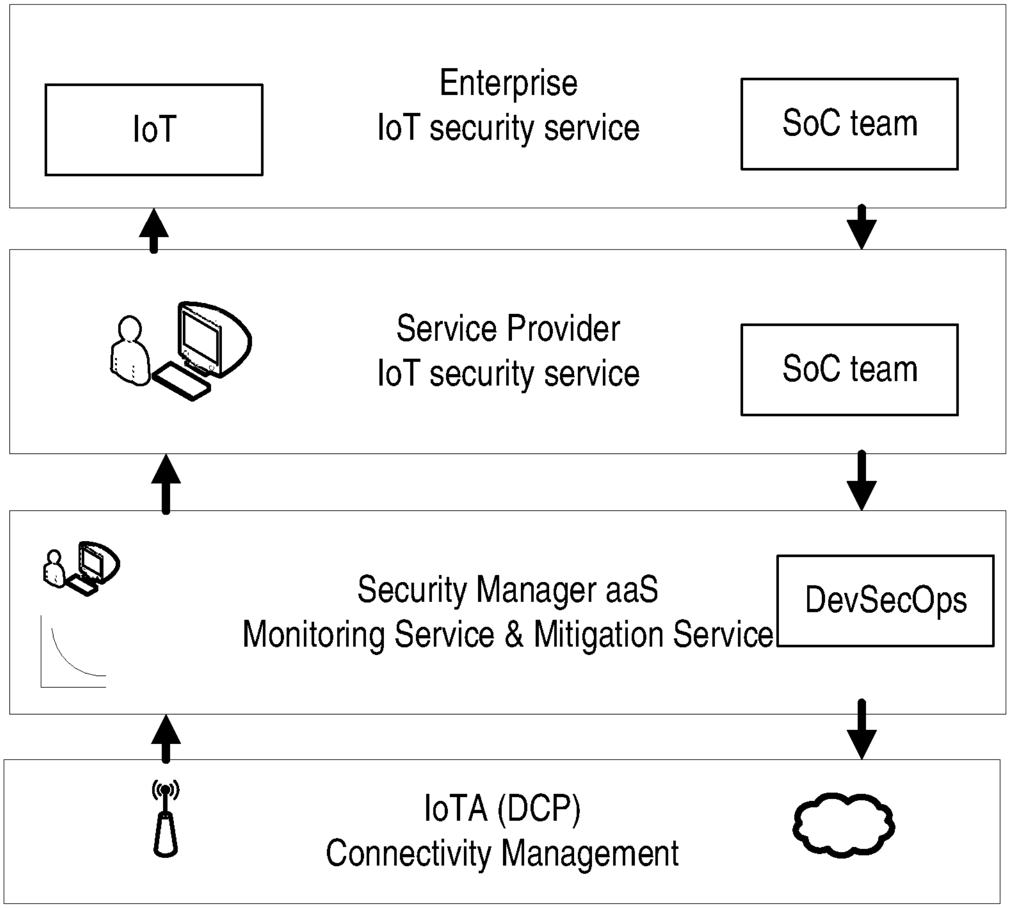
FIG. 1 is a diagram of general context for security service users.

Before describing in detail exemplary embodiments, it is noted that the embodiments reside primarily in combinations of apparatus components and processing steps related to multi-entity data anonymization and analysis. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments, "sharing" of parameters and/or data may generally refer to transmission and/or reception of the parameters and/or data.

In some embodiments described herein, the term "coupled," "connected," and the like, may be used herein to indicate a connection, although not necessarily directly, and may include wired and/or wireless connections.

The term "node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. The wireless device may generate customer/user specific data that may be anonymized for analysis as described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
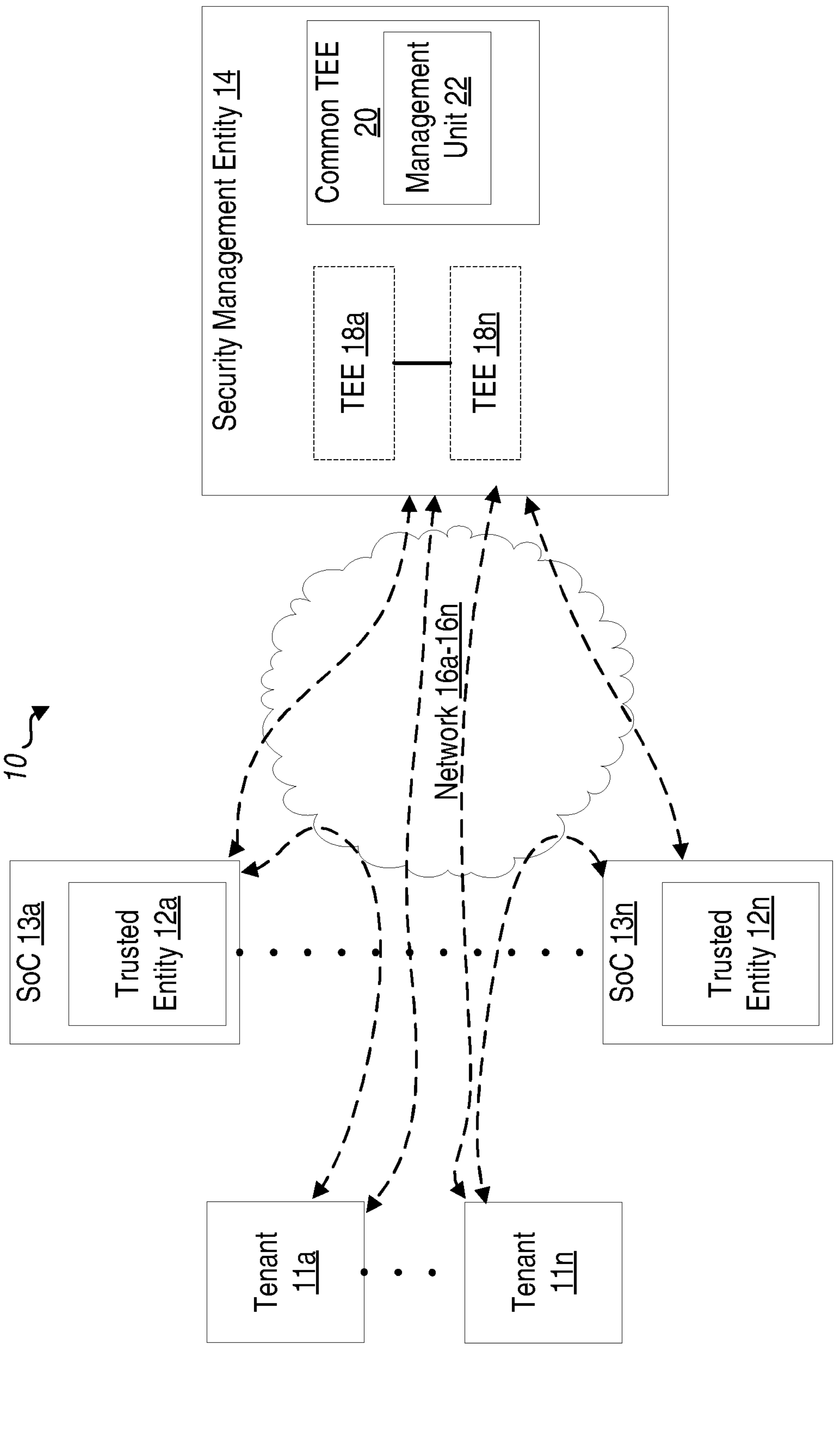
FIG. 2 is a block diagram of a multi-tenant system with forensics capabilities according to the principles of the disclosure.

Referring again to the drawing figures, in which like elements are referred to by like reference numerals, there is shown in FIG. 2 a schematic diagram of a system 10, according to an embodiment, which comprises an one or tenants 11*a*-11*n* and one or more trusted entities 12*a*-12*n* (collectively referred to as trusted entity 12) that may be part of respective security operation centers (SoC 13*a-n*). In one or more embodiments, each tenant 11 is associated with respective trusted entity 12 and SoC 13. The trusted entity 12 that are in communication with security management entity 14 and/or SoC 13 via one or more networks 16*a*-16*n* (collectively referred to as network 16). Trusted entity 12 may correspond to one or more devices such as a security officer device that is associated with a specific entity/customer where one of more of the devices generate customer data.

Security management entity 14 may correspond to an entity that one or more of monitors, analyzes, compiles controls, performs analytics, performs security functions, performs other functions described herein, etc. In one or more embodiments, the security management entity 14 may generally provide a solution for end to end security management, supporting different domains (e.g., device, access network and connectivity, applications and cloud) consisting of different trust anchors and security functions. The security management entity 14 may generally support horizontal end to end data management across all domains. Further, the security management entity 14 may generally provide the possibility to collect, store and analyze traffic and data from the different layers. Data may be collected in the form of security logs or traffic that may be captured from the connectivity layer of a network through probes.

The security management entity 14 may perform continuous protection including security analytics, which can provide, using the data, one or more of: security insights and actions, covering vulnerabilities, threats, risks, and fraud events. The security analytics aim for faster response times and shortening the detection time for security and privacy breaches. The security analytics may use rule and machine-learning based analytics for detecting known and unknown threats across different network domains. Further, the security analytics may provide constant visibility to the risk landscape and help to target actions to higher risk areas to reduce the attack surface and/or probability of attack.

The security management entity 14 may be capable of multi-tenancy/entity support providing capabilities to provide access to all security management entity 14 functions and features that occur in the context of a tenant, have per tenant own identity and entitlement management system, thereby helping ensure all events and data are either provider or tenant owned and providing full isolation of tenant data. The security management entity 14 may need to anonymize certain sensitive data objects before the security analytics.

The security management entity 14 includes one or more Trusted Execution Environment (TEEs) 18*a*-18*n* where each TEE 18 is configured to provide a secured environment for data associated with a respective trusted entity 12. For example, TEE 18*a* may be configured to provide a secured environment for data associated with trusted entity 12*a*.

Security management entity 14 includes a common TEE 20 that is configured to provide a secured environment for the various trusted entities 12 such as for trusted entity 12*a*-12*n*. Communication may be performed between the common TEE 20 and other TEEs 18. The common TEE 20 includes management unit 22 that is configured to perform one or more common TEE 20 functions described herein such as with respect to anonymization and/or deanonymization.

Figure 3:
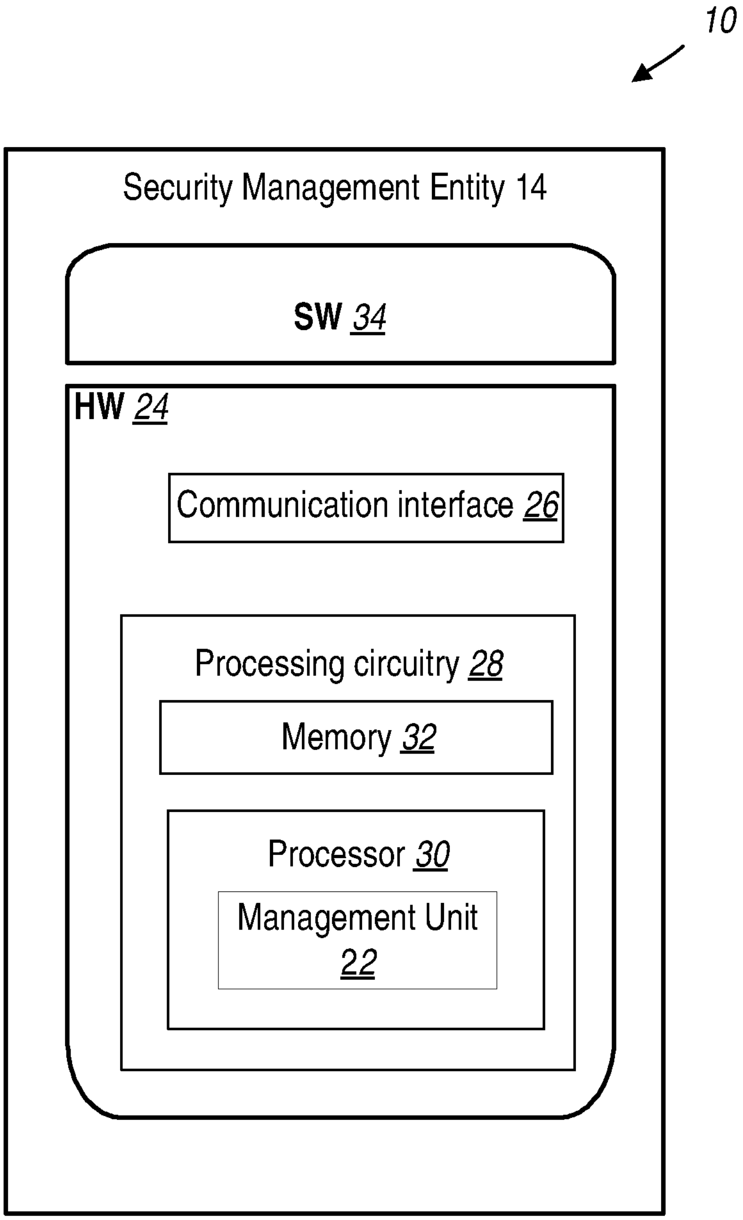
FIG. 3 is a block diagram of a security management device according to the principles of the disclosure.

An example implementation in accordance with one or more embodiments, of security management entity 14 discussed in the preceding paragraphs will now be described with reference to FIG. 3. Security management entity 14 includes hardware (HW) 24 including a communication interface 26 configured to set up and maintain a wired or wireless connection with an interface of a different communication device of the communication system 10. The security management entity 14 further comprises processing circuitry 28, which may have storage and/or processing capabilities. The processing circuitry 28 may include a processor 30 and memory 32 (i.e., a computer readable storage medium such as a non-transitory computer readable storage medium). In particular, in addition to or instead of a processor, such as a central processing unit, and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 30 may be configured to access (e.g., write to and/or read from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 28 may be configured to control any of the methods and/or processes described herein and/or to cause such methods, and/or processes to be performed, e.g., by security management entity 14. Processor 30 corresponds to one or more processors 30 for performing security management entity 14 functions described herein. The security management entity 14 includes memory 32 that is configured to store data, programmatic software code and/or other information described herein. In some embodiments, the software 34 that may include instructions that, when executed by the processor 30 and/or processing circuitry 28, causes the processor 30 and/or processing circuitry 28 to perform the processes described herein with respect to security management entity 14. The instructions may be software associated with the security management entity 14.

The software 34 may be executable by the processing circuitry 28. The processing circuitry 28 and the processor 30 of the security management entity 14 may include a management unit 22 that is configured to perform one or more security management entity 14 functions described herein such as with respect to scheme implementation with respect to anonymization and deanonymization of data.

Figure 4:
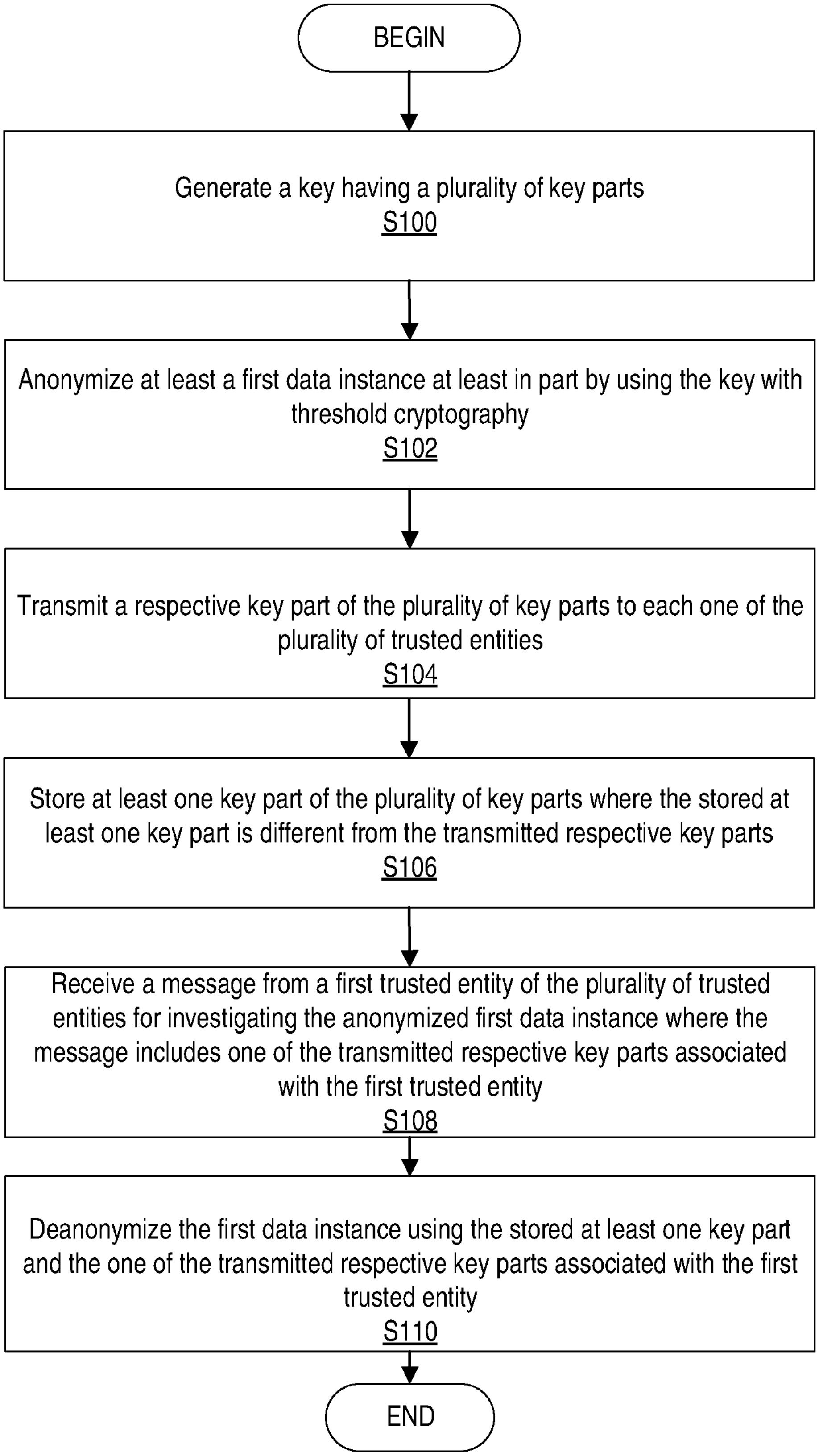
FIG. 4 is a flow diagram of a process according to the principles of the disclosure.

FIG. 4 is flow diagram of an exemplary process in security management entity 14 according to one or more embodiments of the present disclosure. One or more Blocks and/or functions performed by security management entity 14 may be performed by one or more elements of security management entity 14 such as by management unit 22 in processing circuitry 28, processor 30, communication interface 26, etc. In one or more embodiments, security management entity 14 such as via one or more of processing circuitry 28, processor 30, management unit 22, and communication interface 26 is configured to generate (Block S100) a key having a plurality of key parts, as described herein.

In one or more embodiments, security management entity 14 such as via one or more of processing circuitry 28, processor 30, management unit 22, and communication interface 26 is configured to anonymize (Block S102) at least a first data instance at least in part by using the key with threshold cryptography, as described herein. In one or more embodiments, security management entity 14 such as via one or more of processing circuitry 28, processor 30, management unit 22, and communication interface 26 is configured to transmit (Block S104) a respective key part of the plurality of key parts to each one of the plurality of trusted entities 12, as described herein.

In one or more embodiments, security management entity 14 such as via one or more of processing circuitry 28, processor 30, management unit 22, and communication interface 26 is configured to store (Block S106) at least one key part of the plurality of key parts, the stored at least one key part being different from the transmitted respective key parts, as described herein. In one or more embodiments, security management entity 14 such as via one or more of processing circuitry 28, processor 30, management unit 22, and communication interface 26 is configured to receive (Block S108) a message from a first trusted entity 12 of the plurality of trusted entities 12 for investigating the anonymized first data instance, the message including one of the transmitted respective key parts associated with the first trusted entity 12, as described herein. In one or more embodiments, security management entity 14 such as via one or more of processing circuitry 28, processor 30, management unit 22, and communication interface 26 is configured to deanonymize (Block S110) the first data instance using the stored at least one key part and the one of the transmitted respective key parts associated with the first trusted entity, as described herein.

According to one or more embodiments, the anonymizing includes concatenating each of a plurality of data instances with a respective token, and anonymizing each concatenation of the data instance with the respective token using the key with threshold cryptography, the plurality of data instances including the first data instance. According to one or more embodiments, the anonymizing includes adding a token to the first data instance and encrypting both the first data instance and the token, the token being specific to the first data instance. According to one or more embodiments, the deanonymization of the first data instance includes: decrypting a subset of a plurality of data instances having a same attribute type as the first data instance where the subset includes the first data instance, filtering the subset based on a value associated with the attribute type, retrieving a value associated with the token, and de-concatenating the value associated with the token from the decrypted first data instance.

According to one or more embodiments, the stored at least one key is a plurality of stored key parts different from the transmitted respective key parts. According to one or more embodiments, a quantity of the stored plurality of keys equals a quantity of the plurality of trusted entities. According to one or more embodiments, the threshold cryptography is configured for a (k, n) schema where k key parts out of n key parts are used to retrieve the key where n is equal to a sum of a quantity of trusted entities and a quantity of the stored at least one key part. According to one or more embodiments, the processing circuitry is further configured to transmit the deanonymize first data instance to the first trusted entity. According to one or more embodiments, the message from the first trusted entity of the plurality of trusted entities for investigating the first data instance is associated with an occurrence of at least one predefined security event.

Having generally described arrangements for anonymization and deanonymization in environments such as multi-tenant environments, details for these arrangements, functions and processes are provided as follows, and which may be implemented by the security management entity 14.

An example is provided below to aid understanding.

At time t1, the subscriber ID attribute is anonymized for all users in a security management entity 14 enclave.

At time t2, based on external event or some attack detected by tenant 11*a*'s SoC 13*a*, the subscriber IDs for one or several users (u1, . . . , uN) are designated as suspect or malicious. As such, there is a need for the anonymized attributes, here subscriber IDs, to be tracked/analyzed. For example, there is a need to investigate the past logs in tenant 11*a*'s enclave with attribute ID for subscribers u1, . . . , uN. Therefore, backtracking the subscriber IDs to be able to verify the validity of suspicion at time t2 is desired where backtracking of the subscriber ID that is anonymized is provided as described herein while existing system do not provide backtracking.

Figure 5:
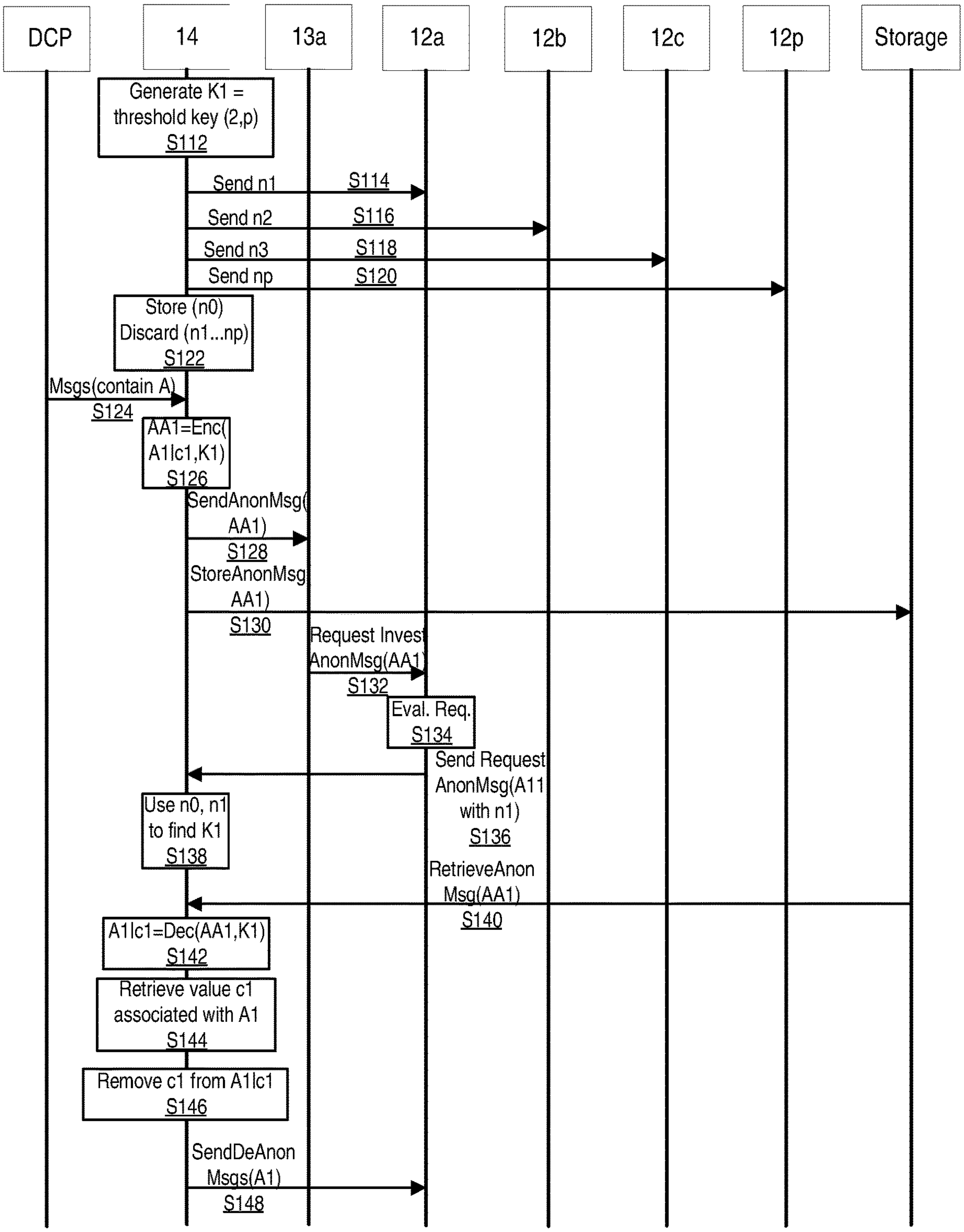
FIG. 5 is a signaling diagram according to the principles of the disclosure.

General steps for one or more embodiments are described below with reference to FIG. 5.

Step 1: Initialization

A key K1 is created/generated (Block S112) such as via one or more of processing circuitry 28, processor 30, communication interface 26, management unit 22, etc., for anonymizing the attribute type A where in one more embodiments the key K1 is a threshold key (2,p). In particular, a threshold crypto approach is used such as via one or more of processing circuitry 28, processor 30, communication interface 26, management unit 22, etc., to encrypt the attribute where the threshold is set to (k,n) schema, i.e., k parts out of n parts are necessary to retrieve K1. In the example of FIG. 5, k=2 and n=p. The anonymization is performed such as via one or more of processing circuitry 28, processor 30, communication interface 26, management unit 22, etc., by encrypting the attribute using K1. Note that the security of the shares (i.e., key shares, key parts, etc.) is outside the scope of the disclosure and will not be further discussed.

For example AAi=enc(K1, Ai|ci) is the anonymized value for Ai, ith instance of attribute type A, where "|" presents the concatenation operation and ci is a nonce for ith instance To illustrate this, AA1=enc(K1, A1|c1), AA2=enc(K1, A2|c2), and concatenate c1 and c2 respectively to AA1 and AA2 in the anonymized data. By changing the nonce at each instance one or more embodiments described herein are able to provide full anonymization where AA1, AA2 . . . etc., cannot be traced back to A and at the same time they are anonymized such that AA1 is different AA2. When decrypting, c1 may be used to extract from AA1 the value of A1|c1 (A1|c1=dec (AA1, K1)).

For the simplicity, it may be assumed that threshold crypto is (2, n+1), where n is the total quantity of tenants served by security management entity 14 and 2 is the minimal quantity of the shares necessary to find K1.

The n parts are distributed such as via one or more of processing circuitry 28, processor 30, communication interface 26, management unit 22, etc., among/transmitted to (Blocks S114-S120) trusted parties/entities 12 for each tenant 11. These trusted parties/entities 12 may be authorized by each tenant 11 to investigate the attributes for that tenant 11 or at least each trusted party/entity 12 that is authorized by a respective tenant 11 to investigate the attributes for the respective tenant 11 should receive a part of the n parts, for example.

For simplicity, it may be assumed that there is only one trusted 3rd party per tenant 11, referred to as a security officer (SO), which may be a security entity such as a device that is part of security operation center 13 (SoC 13). In one or more embodiments, the SO is trusted entity 12.

Note that the quantity/number n and k can be modified to address different configuration needs as described herein.

In particular, n parts are shared among the security management entity 14 and the SOs for different tenants 11. For example, tenant 11*a*'s SO, referred to as SOa (i.e., trusted entity 12*a*) may be provided n1 (Block S114) such as via one or more of processing circuitry 28, processor 30, communication interface 26, management unit 22, etc., the tenant 11*a*'s SO, Sob (i.e., trusted entity 12*b*) may be provided n2 (Block S116) such as via one or more of processing circuitry 28, processor 30, communication interface 26, management unit 22, etc., etc. The security management entity 14 may store such as via one or more of processing circuitry 28, processor 30, communication interface 26, management unit 22, etc., part n0 and discard (Block S122) the remaining key parts, i.e., discard n1 . . . np in this example.

Step 2: Anonymization at the Security Management Entity 14's TEE

The security management entity 14 receives (Block S122) such as via one or more of processing circuitry 28, processor 30, communication interface 26, management unit 22, etc., message(s) containing attribute instances A and uses K1 to anonymize/encrypt (Block S126) the attribute instances A, e.g., anonymize/encrypt A1, A2, . . . , An. The anonymized traces are sent (Block S128) such as via one or more of processing circuitry 28, processor 30, communication interface 26, management unit 22, etc., to the enterprise A for investigation.

Storing Anonymized Logs

The logs/network traces are logged/stored (Block S130) with anonymized/encrypted values, e.g., AA1, . . . , AAn in S, where storage may occur at a storage device such as a database and/or server.

Step 3: Investigation Authorization by Security Officer

SoC 13*a* of enterprise A, suspects some user u1 of suspicious activity, i.e., user u1 has trigger a security event. SoC 13*a* of enterprise A then determines that it needs attribute A1 to verify the suspicious activity, where the determination of what attribute is needed by the SoC 13 is beyond the scope of the disclosure. This is reported to SOa (i.e., trusted entity 12*a*)(Block S132) as a request to investigate.

SOa evaluates the request and decides to follow up on the request by sending its n1 to security management entity 14 indicating that the data with A1 is to be retrieved (Blocks S134-S136). The evaluation at SOa is beyond the scope of the disclosure.

Step 4: Deanonymizing of the Data According to SO's Authorization

The security management entity 14 receives (Block S136) such as via one or more of processing circuitry 28, processor 30, communication interface 26, management unit 22, etc., the request for investigation on A1 that includes the n1 from SOa (i.e., trusted entity 12*a*). The request is interpreted by the security management entity 14 such as via one or more of processing circuitry 28, processor 30, communication interface 26, management unit 22, etc., as authorization for investigating A1 where, in one or more embodiments, the key part n1 may provide the implicit authorization for the request.

The security management entity 14 using n1, received in or along with or after the request, and its own n0 retrieves (Block S138) such as via one or more of processing circuitry 28, processor 30, communication interface 26, management unit 22, etc., K1.

The security management entity 14 retrieves (Block S140) such as via one or more of processing circuitry 28, processor 30, communication interface 26, management unit 22, etc., logs from storage S and decrypts (Block S142) such as via one or more of processing circuitry 28, processor 30, communication interface 26, management unit 22, etc., all instances of attribute of type A using K1. The security management entity 14 then filters such as via one or more of processing circuitry 28, processor 30, communication interface 26, management unit 22, etc., A1 instances based on some criteria, for example value of A at time t1. This filtering may result in value A1|cx. The value cx retrieved. The security management entity 14 then finds such as via one or more of processing circuitry 28, processor 30, communication interface 26, management unit 22, etc., the value cx in c1 . . . cn used to build Ai|cx, which in this example, security management entity retrieves (Block S144) such as via one or more of processing circuitry 28, processor 30, communication interface 26, management unit 22, etc., c1 that is associated with A1. For example, the value cx could be retrieved based on the time of storage where, at time t1, value c20 is used. The value c20 is then de-concatenated/removed from A1|c20. In this example of FIG. 5, the value c1 would be removed/de-concatenated (Block S146) from A1|c1. The value A1 and corresponding traces are sent (Block S148) such as via one or more of processing circuitry 28, processor 30, communication interface 26, management unit 22, etc., to SOa for further investigation. K1 and n1 are discarded by the security management entity 14.

One or more embodiments described herein are described only for one trusted party/entity 12 per tenant 11, although the teachings are equally applicable to other scenarios/use cases.

Collusion of Different Security Officers (i.e., Trusted Entities 12)

In one or more embodiments, two or more tenant 11*s* may be able to collude with each other to bypass the security management entity 14 in order to deanonymize the stored anonymized data using their respective key parts such that the shares (i.e., key parts) may be arranged differently. For example, it is assumed that one possible attack scenario may be that several SOs (i.e., trusted entities 12) collude together in order to reach the k necessary parts in a (k,n) schema where each tenant 11 is provided with 1 or more respective shares or parts. In this example, it is assumed that k is 2, which means that if two SOs collude together and have access to the stored and anonymized data, the two SOs could then bypass the security management entity 14 using their parts (e.g., their two key parts) to deanonymize the stored data.

To address this possible vulnerability, in one or more embodiments, "enough" shares are created/generated outside of the existing SOs to make collision between different tenants 11 ineffective to retrieve the logs. For example, if there are n customers (i.e., tenant 11)/SOs (i.e., trusted entity 12), threshold for the threshold cryptography is set to n+1. That is, 2n+1 shares are created such as via one or more of processing circuitry 28, processor 30, communication interface 26, management unit 22, etc., where n shares are assigned to the security management entity 14, and one share to each customer/trusted entity 12. In this case, even if all n customers collude with each other they may not have "enough" shares to decrypt the anonymized data because they need n+1 shares for perform the threshold cryptography. At the same time, the security management entity 14 is also unable to perform deanonymization using threshold cryptography, by itself, as the security management entity 14 needs at least one share (i.e., key part) from one of the SOs to meet the threshold of n+1 shares.

Therefore, in one or more embodiments, the configuration is able to prevent any number of tenants 11 up to a predefined threshold from colluding to decrypt anonymized data. The parameterization is a deployment issue can be addressed by the teachings described herein.

The numbers/quantity of shares/key parts and therefore the trusted parties/entities 12 can be increased to avoid possible collisions between different SOs, and/or the number of security officers from a tenant 11 can be increased in order to increase the reliability and trust for each tenant 11.

In addition, one or more embodiments described herein allows, through resharing, the capability to adapt in case parties/trusted entities can no longer be trusted.

Therefore, one or more embodiments, described herein may provide one or more of the following advantages:

- The anonymized traces cannot be decrypted by a lone SO (i.e., trusted entity 12) or by the security management entity 14 by itself. The configuration(s)/scheme(s) described herein may require a tenant 11's SO and the security management entity 14 to collaborate to find and decrypt anonymized logs/data. Further, the handling and storing the traces/data is outsourced by different tenants 11 to the security management entity 14. Therefore, this approach can be used in a multi-tenant environment served by the security management entity 14.
- The anonymization/deanonymization is outsourced by the tenant 11 to the security management entity 14. To deanonymize the data, the security management entity 14 needs SO's key part. By using different anonymization keys, as described herein, for different types of attributes, data, etc., the SO can authorize the deanonymization of selected data by the security management entity 14. The approach then supports authorized partial deanonymization.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C"

programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A security management entity for communication with a plurality of trusted entities, the security management entity comprising:
- processing circuitry configured to:
  - split a cryptographic key into a plurality of key parts where a threshold number of key parts are combinable to reconstruct the cryptographic key according to threshold cryptography;
  - anonymize at least a first data instance at least in part by using the key with threshold cryptography;
  - transmit a respective key part of the plurality of key parts to each one of the plurality of trusted entities;
  - store at least one key part of the plurality of key parts, the stored at least one key part being different from the transmitted respective key parts;
  - receive a message from a first trusted entity of the plurality of trusted entities for investigating the anonymized first data instance, the message including one of the transmitted respective key parts associated with the first trusted entity; and
  - deanonymize the first data instance using the cryptographic key that is reconstructed using the stored at least one key part and the one of the transmitted respective key parts associated with the first trusted entity.

2. The security management entity of claim 1, wherein the anonymizing includes:
- concatenating each of a plurality of data instances with a respective token; and
- anonymizing each concatenation of the data instance with the respective token using the cryptographic key with threshold cryptography, the plurality of data instances including the first data instance.

3. The security management entity of claim 1, wherein the anonymizing includes adding a token to the first data instance and encrypting both the first data instance and the token, the token being specific to the first data instance.

4. The security management entity of claim 3, wherein the deanonymization of the first data instance includes:
- decrypting a subset of a plurality of data instances having a same attribute type as the first data instance, the subset including the first data instance;
- filtering the subset based on a value associated with the attribute type;
- retrieving a value associated with the token; and
- de-concatenating the value associated with the token from the decrypted first data instance.

5. The security management entity of claim 1, wherein the stored at least one key is a plurality of stored key parts different from the transmitted respective key parts.

6. The security management entity of claim 5, wherein a quantity of the stored plurality of key parts equals a quantity of the plurality of trusted entities.

7. The security management entity of claim 1, wherein the threshold cryptography is configured for a (k, n) schema where k key parts out of n key parts are used to reconstruct the cryptographic key where n is equal to a sum of a quantity of trusted entities and a quantity of the stored at least one key part.

8. The security management entity of claim 1, wherein the processing circuitry is further configured to transmit the deanonymize first data instance to the first trusted entity.

9. The security management entity of claim 1, wherein the message from the first trusted entity of the plurality of trusted entities for investigating the first data instance is associated with an occurrence of at least one predefined security event.

10. A method for a security management entity for communication with a plurality of trusted entities, the method comprising:
- splitting a cryptographic key into a plurality of key parts where a threshold number of key parts are combinable to reconstruct the cryptographic key according to threshold cryptography;
- anonymizing at least a first data instance at least in part by using the key with threshold cryptography;
- transmitting a respective key part of the plurality of key parts to each one of the plurality of trusted entities;
- storing at least one key part of the plurality of key parts, the stored at least one key part being different from the transmitted respective key parts;
- receiving a message from a first trusted entity of the plurality of trusted entities for investigating the anonymized first data instance, the message including one of the transmitted respective key parts associated with the first trusted entity; and
- deanonymizing the first data instance using the cryptographic key that is reconstructed using the stored at least one key part and the one of the transmitted respective key parts associated with the first trusted entity.

11. The method of claim 10, wherein the anonymizing includes:
- concatenating each of a plurality of data instances with a respective token; and
- anonymizing each concatenation of the data instance with the respective token using the cryptographic key with threshold cryptography, the plurality of data instances including the first data instance.

12. The method of claim 10, wherein the anonymizing includes adding a token to the first data instance and encrypting both the first data instance and the token, the token being specific to the first data instance.

13. The method of claim 12, wherein the deanonymization of the first data instance includes:

decrypting a subset of a plurality of data instances having a same attribute type as the first data instance, the subset including the first data instance;

filtering the subset based on a value associated with the attribute type;

retrieving a value associated with the token; and de-concatenating the value associated with the token from the decrypted first data instance.

14. The method of claim 10, wherein the stored at least one key is a plurality of stored key parts different from the transmitted respective key parts.

15. The method of claim 14, wherein a quantity of the stored plurality of key parts equals a quantity of the plurality of trusted entities.

16. The method of claim 10, wherein the threshold cryptography is configured for a (k, n) schema where k key parts out of n key parts are used to reconstruct the cryptographic key where n is equal to a sum of a quantity of trusted entities and a quantity of the stored at least one key part.

17. The method of claim 10, further comprising transmitting the deanonymize first data instance to the first trusted entity.

18. The method of claim 10, wherein the message from the first trusted entity of the plurality of trusted entities for investigating the first data instance is associated with an occurrence of at least one predefined security event.

19. A non-transitory computer readable storage medium configured to store instructions, which when executed by a processor, causes the processor to:

split a cryptographic key into a plurality of key parts where a threshold number of key parts are combinable to reconstruct the cryptographic key according to threshold cryptography;

anonymize at least a first data instance at least in part by using the key with threshold cryptography;

transmit a respective key part of the plurality of key parts to each one of a plurality of trusted entities;

store at least one key part of the plurality of key parts, the stored at least one key part being different from the transmitted respective key parts;

receive a message from a first trusted entity of the plurality of trusted entities for investigating the anonymized first data instance, the message including one of the transmitted respective key parts associated with the first trusted entity; and deanonymize the first data instance using the cryptographic key that is reconstructed using the stored at least one key part and the one of the transmitted respective key parts associated with the first trusted entity.

20. The non-transitory computer readable storage medium of claim 19, wherein the anonymizing includes adding a token to the first data instance and encrypting both the first data instance and the token, the token being specific to the first data instance; and the deanonymization of the first data instance includes:

decrypting a subset of a plurality of data instances having a same attribute type as the first data instance, the subset including the first data instance;

filtering the subset based on a value associated with the attribute type;

retrieving a value associated with the token; and de-concatenating the value associated with the token from the decrypted first data instance.

* * * * *